G. R. SMITH.
COMBINATION ELECTRIC SWITCH.
APPLICATION FILED FEB. 7, 1918.
1,321,400.
Patented Nov. 11, 1919.
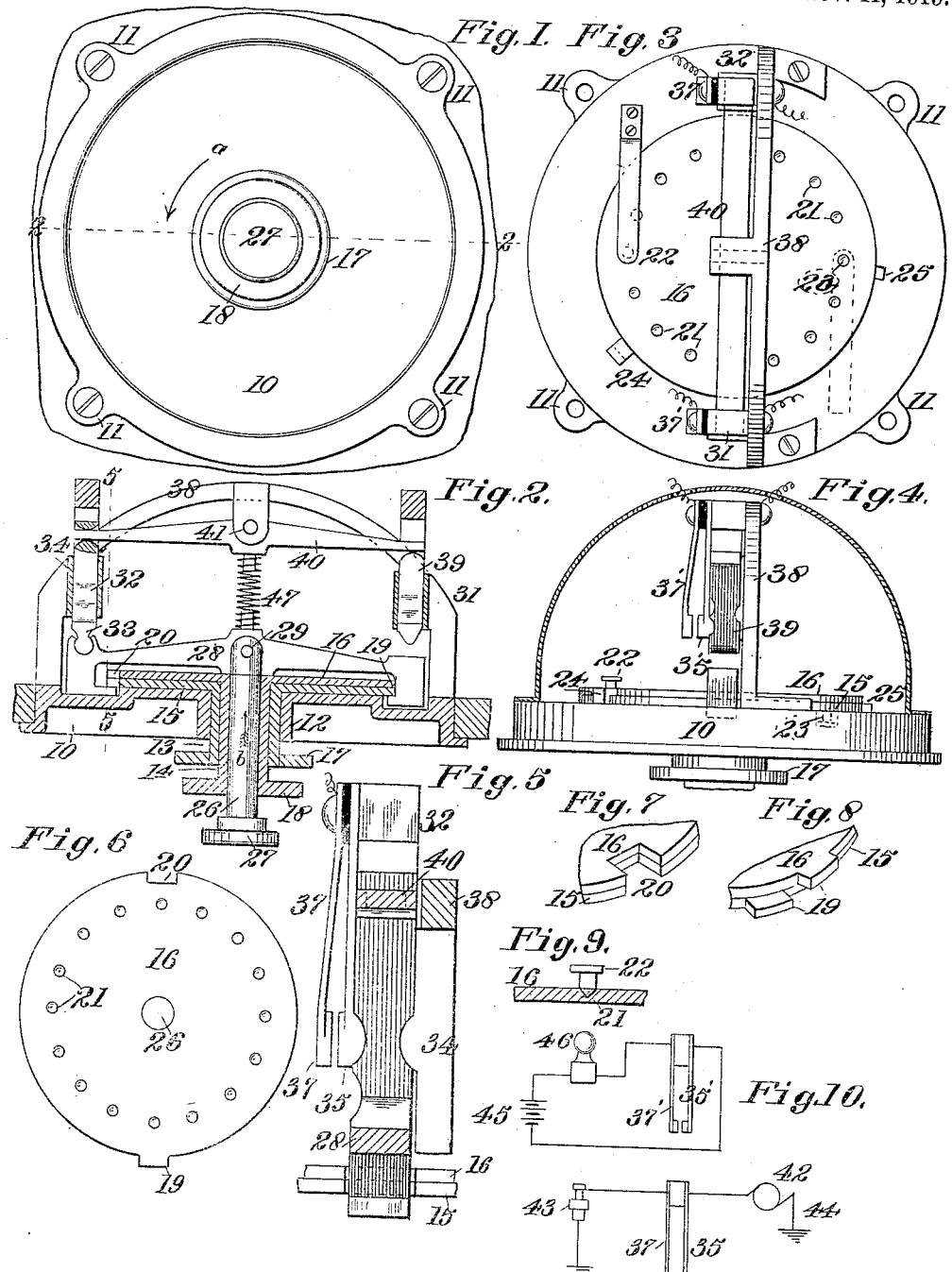
Inventor.
Glenn R. Smith.
By Strong & Townsend
ATTORNEYS

UNITED STATES PATENT OFFICE.

GLENN R. SMITH, OF LOMPOC, CALIFORNIA, ASSIGNOR OF ONE-FOURTH TO ALBERT M. JOHNSON AND ONE-FOURTH TO ISABELLE SMITH JOHNSON, BOTH OF LOMPOC, CALIFORNIA.

COMBINATION ELECTRIC SWITCH.

1,321,400.     Specification of Letters Patent.     Patented Nov. 11, 1919.

Application filed February 7, 1918. Serial No. 215,826.

*To all whom it may concern:*

Be it known that I, GLENN R. SMITH, a citizen of the United States, residing at Lompoc, in the county of Santa Barbara and State of California, have invented new and useful Improvements in Combination Electric Switches, of which the following is a specification.

This invention relates to an electric switch, and particularly pertains to a lock-controlled switch especially adapted for use in connection with the magneto circuit of an automobile.

It is the principal object of this invention to provide a switch for controlling the magneto circuit of an automobile engine, and which may be placed in convenient reach of the driver of the vehicle and, when operated, will make and break the magneto circuit as well as establish an auxiliary circuit when molested by unauthorized persons.

Another object of this invention is to provide a combination lock for a switch of the above character which may be set to permit the magneto circuit to be operated and which is normally in condition to establish the auxiliary signal circuit when actuated, the mechanism being so inclosed as to conceal the operating members so that the combination of the lock cannot be ascertained nor the condition of the lock members.

Another object of this invention is to provide a differentially operated switch mechanism which will alternately actuate the magneto circuit switch and the auxiliary signal circuit switch when the lock is properly set and which will not permit the auxiliary circuit to be broken until the lock mechanism is restored to its set position.

Other objects will appear hereinafter.

The invention is illustrated by way of example in the accompanying drawings, in which—

Figure 1 is a fragmentary view of an automobile dashboard, disclosing the face plate of the switch and the operating knobs extending therefrom.

Fig. 2 is a view in transverse section and elevation as seen on the line 2—2 of Fig. 1, and particularly discloses the vital elements of the invention and their correlation to each other.

Fig. 3 is a view in plan, illustrating the opposite side of the device from that shown in Fig. 1 and disclosing the permutation disks and diametrically disposed switches.

Fig. 4 is a view in side elevation, illustrating in detail one of the switch members.

Fig. 5 is an enlarged view in vertical section, as seen on the line 5—5 of Fig. 2, more clearly disclosing one of the switches.

Fig. 6 is a plan view of one of the permutation disks of the lock.

Figs. 7 and 8 illustrate fragmentary views of the lock disks and the projections and recesses arranged on diametrically opposite sides of each disk.

Fig. 9 is a fragmentary view illustrating the spring finger by which the combination may be felt as the disks are rotated.

Fig. 10 is a diagrammatic view illustrating the two switches and their respective electric circuits.

Referring more particularly to the drawings, 10 indicates a disk-shaped face plate which also serves as a base for the entire device. This face plate is formed with a series of lugs 11 by which it may be secured to a convenient surface upon the dashboard of an automobile. A central cylindrical hub 12 extends from this plate and is adapted to receive concentric telescoping hubs 13 and 14 of lock disks 15 and 16, respectively. These disks lie parallel to the rear face of the plate and are here shown as bearing upon each other. The disk hubs are formed with annular flanges forming knobs 17 and 18 by which the disks may be rotated.

As particularly shown in Fig. 6, each of the disks is circular and has an outwardly projecting lug 19 upon one of its sides and a recess 20 formed in the opposite side. Distributed over the face of both disks are recesses 21. These recesses are arranged in a circle concentric with the central axis of the disk and are adapted to register with spring fingers 22 and 23. The finger 22 bears down upon the upper disk 16 and has a point which is formed to extend into the recesses 21. The finger 23 bears upwardly against the lower disk 15 and registers with the recesses upon this disk. In this manner the exact amount of rotation of each disk may be readily determined as is common in combination locks.

Fixed to the plate 10 and in the path of travel of the disk lugs 19 are stop pins 24 and 25. These pins limit the movement of the disk and afford a point from which a combination may be worked.

The hub 14 of the outer disk 16 is tubular and forms a bearing for a slidable shaft 26. This shaft is fitted at its outer end with a knob 27 and forms a mounting at its inner end for an equalizer bar 28. The bar 28 is fixed to the shaft by means of a pivot pin 29 which allows it to have a free swinging movement in relation thereto. The opposite ends of the bar overhang the outer periphery of the combination disks and are formed with inturned fingers which normally seat within recesses in the base plate and will alternately swing upwardly when the knob 27 is pressed inwardly. One of these fingers is adapted to stand in the path of travel of the lugs 19 when in its upper position while the other finger is adapted to pass into the recesses 20 when in its upper position. Due to this arrangement the engagement of one finger by the lugs upon the disk will permit the other finger to pass upwardly through the recesses and actuate a switch with which it is intimately related.

The equalizer bar is provided to alternately operate switch mechanisms 31 and 32 which are disposed upon opposite sides of the device and supported above the opposite ends of the bar. The end of the bar beneath the switch mechanism 32 is formed with a socket joint adapted to receive the enlarged end of a wedge member 33 which is supported between a rigid fitting 34 and a spring finger 35.

As shown in Fig. 5, the wedge is formed with two reduced neck portions with which curved projections upon its opposite supports will register. Thus when in its lowermost position the action of the spring member 35 will hold it until forced to its upper position when this finger will register with the lower recess in its side. The depth of this lower recess is less than the upper one and thus forces the spring finger against a contact member 37, completing an electric circuit as will be hereinafter described. The contact member is secured to and insulated from a rigid arched frame 38 by which the fingers of the switch and the wedge blocks are supported.

Due to the peculiar connection between the wedge block 33 and the equalizer bar, upward movement of this end of the bar will raise the wedge and downward movement will lower it. This is not the case with the wedge block 39 provided in the opposite switch mechanism 31. In this structure the wedge block and the end of the bar are separate and when the block is forced upwardly between the fingers 34 and 35 it will remain until the opposite block is raised. When this operation takes place a rocker arm 40 will be swung downwardly over the block 39 to force it from registering between the fingers 34 and 35 and break an alarm circuit which will hereafter be described. The rocker arm is centrally pivoted upon a pin 41 held by the frame member 38 and extends outwardly into the path of travel of the two wedge blocks 33 and 39, thus causing the blocks to have cooperative movement and to move in alternate directions.

The two electric circuits controlled by the spring fingers 35 and 37 and similar fingers 35' and 37' are particularly shown in Fig. 10. The wedge block 33 when moved upwardly will affect the fingers 35 and 37 to close a circuit from a magneto 42 through the fingers and to spark plugs 43, thereafter returning along ground wires 44. The fingers 35' and 37' when closed by the switch block 39 complete a circuit through a battery 45 or other source of supply and an alarm bell 46.

In operation, the stop pins 24 and 25 are set at predetermined points around the circumference of the disks and secured to the face plate. These points bear a definite relation to the lugs 19 upon the disk and the diametrically opposite recesses 20. Assuming that the lugs are brought to bear against their respective stop pins, rotation of the knob 18 in the direction of arrow $a$, as shown in Fig. 1, will move the lugs around toward the switch mechanism 31. As the operator knows definitely the number of spaces to be moved, as determined by the distance between the recesses upon the dials, he may easily bring the two lugs in register with the finger of the equalizer arm beneath the wedge block 39. This, of course, requires manipulation of both lugs by their knobs 17 and 18. When this has been done the knob 27 and its shaft 26 may be forced inwardly in the direction of arrow $b$, as shown in Fig. 2, and will force the bar 28 upwardly. As the finger of the bar beneath the lugs 19 will prevent that end of the bar from rising, a fulcrum point will be established from which the opposite end of the bar will swing, thus forcing the wedge 33 between the fingers 34 and 35. This will instantly complete the magneto circuit and due to the construction shown will maintain the circuit until the shaft 26 is drawn outwardly.

After the circuit has been broken the two dials may be given a few turns and the combination lost. In case an unauthorized person endeavors to operate the lock it will be highly improbable that he will bring both lugs of the disks to register with the proper end of the equalizer bar and the finger thereon. In case this is not done and the knob 27 is pressed, the fulcrum of the equalizer bar will be transferred to the opposite side of the disks. At this time the finger of the bar beneath the wedge 33 will encounter the body of the disks as the recesses are not in register therewith and the opposite end will swing upwardly to force the wedge block 40 into position between its fingers 35' and 37'. Spring 47 will then restore the bar 20 to its original position and leave the wedge 39 in a position to maintain the circuit of the alarm bell 46 closed. This circuit cannot be broken until the dials are properly set to transfer the point of fulcrum and allow the wedge 33 to move upwardly, thereby actuating the rocker arm 40 and swinging the wedge 39 downwardly.

It will be understood that the entire lock mechanism and the switches will be properly inclosed within a case which will be inaccessible and will thus insure that the mechanism will not be tampered with nor the combination of the lock ascertained.

It will thus be seen that by the device here disclosed a magneto circuit may be readily opened and closed and locked and that when the operating mechanism is molested by unauthorized persons an alarm bell circuit will be completed and will be maintained until the rightful owner manipulates the lock mechanism according to a predetermined combination.

While I have shown the preferred form of my invention as now known to me, it will be understood that various changes in the combination, construction and arrangement of parts may be made by those skilled in the art without departing from the spirit of the invention as claimed.

Having thus described my invention, what I claim and desire to secure by Letters Patent is—

1. An electric switch comprising a base plate, a rigid supporting frame carried thereby, independent switch members mounted upon said frame, an operating bar extending through the plate, means whereby pressure upon said bar will close one of said switch members, and means for determining which of said switch members will be closed when the operating bar is pressed.

2. In an electrical apparatus, a pair of switches, a common means for directly closing either of said switches, positive means for directly opening one of said switches, indirectly acting means for opening the other of said switches, and a lock by which the switch to be positively closed will be determined.

3. A lock switch comprising a base plate, a pair of permutation disks rotatably supported by said plate, means for separately rotating said disks, a bar extending transversely of the disks and having fingers projecting beneath the opposite sides thereof, complementary lugs extending outwardly from each of the disks at a point on their periphery, complementary recesses formed in the periphery of the disks and diametrically opposite from the lugs, said lugs and recesses being adapted to register with the fingers, a pair of switches, one of which may be closed by each end of the bar, and means whereby the switches may be separately actuated as determined by the relative position of the disks in relation to each other and the fingers of the bars.

4. An electric switch comprising a base plate, an upstanding frame member thereon, a rocker arm centrally pivoted to said frame member, wedge blocks, one of which is beneath each rocker arm, separate yieldable supports for said wedge blocks, contact means mounted upon each of said wedge blocks and included within separate electric circuits, an equalizer bar beneath each of the wedge blocks, a push-rod adapted to move the equalizer bar toward the wedge blocks, a set of permutation disks rotatably positioned around the push-rod, and means whereby the relative positions of the disks in relation to each other and the equalizer bar will determine which of the wedge blocks will be moved to establish a circuit through the complementary contact members.

5. In an electric switch, independent switch members, a rocker arm connected to each of the switch members whereby when one member is closed the other member will be opened, and means including a depressible and a rockable element for determining which of the members will be closed.

6. In an electric switch, independent switch members, means whereby when one member is closed the other member will be opened, means for determining which of the members will be closed, and operating means for the members controlled by the position of said determining means.

7. In an electric switch, independent switch members, rockable means for closing either of the members, and means movable to different positions for controlling the rockable means and thereby determining which of the members will be closed.

8. In an electric switch, independent switch members, rockable means for closing either of the members, and means for determining which of the members will be closed, said last-named means providing different fulcra in different positions for said rockable means.

9. In an electric switch, a pair of independent switch members, means whereby when one member is closed the other will remain open, and means including a depressible element for actuating said members whereby to close said other member while the first member remains open.

10. In an electric switch, a pair of independent switch members, combined rockable and reciprocal means for independently actuating said members, and means for determining which of said members the first-named means will actuate.

11. In an electric switch, a pair of independent switch members, means to close either member to the exclusion of the other, and means whereby to prevent opening of one of said members except through closing of the other member.

12. In an electric switch, a pair of switch members, rockable means to move either member to closed position according to the direction in which said means is rocked, means to actuate the rockable means, and means controlling the rockable means for determining the direction of rocking of the rockable means.

13. In an electric switch, a pair of independent switch members, depressible means common to each member to actuate either to the exclusion of the other, and means to determine which of said members will be actuated upon depression of said depressible means.

14. In an electric switch, a pair of independent switch members, actuating means having different movements common to both members to close either to the exclusion of the other, and means controlling said actuating means to determine the character of movement of the actuating means so as to select which of said members will be closed.

15. In an electric switch, a pair of independent switch members, means common to both members to actuate either to the exclusion of the other, and means controlling said common means to select which of said members will be closed.

In testimony whereof I have hereunto set my hand in the presence of two subscribing witnesses.

GLENN R. SMITH.

Witnesses:
MINNIE MOWRY,
M. J. DAVIS.